(12) United States Patent
Hayama et al.

(10) Patent No.: US 9,108,667 B2
(45) Date of Patent: Aug. 18, 2015

(54) MOTOR VEHICLE STEERING SYSTEM

(75) Inventors: Ryouhei Hayama, Nabari (JP); Naotake Kanda, Yamatokoriyama (JP)

(73) Assignee: JTEKT CORPORATION, Osaka (JP)

( * ) Notice: Subject to any disclaimer, the term of this patent is extended or adjusted under 35 U.S.C. 154(b) by 63 days.

(21) Appl. No.: 13/695,728

(22) PCT Filed: Jun. 10, 2011

(86) PCT No.: PCT/JP2011/063380
§ 371 (c)(1),
(2), (4) Date: Nov. 1, 2012

(87) PCT Pub. No.: WO2011/158754
PCT Pub. Date: Dec. 22, 2011

(65) Prior Publication Data
US 2013/0046442 A1 Feb. 21, 2013

(30) Foreign Application Priority Data

Jun. 16, 2010 (JP) ................. 2010-137448

(51) Int. Cl.
B62D 6/00 (2006.01)
B62D 5/00 (2006.01)
B62D 1/04 (2006.01)
B66F 9/075 (2006.01)

(52) U.S. Cl.
CPC .............. B62D 1/043 (2013.01); B66F 9/0755 (2013.01); B66F 9/07568 (2013.01)

(58) Field of Classification Search
CPC ............ B62D 1/00; B62D 1/042; B66F 9/00; B66F 9/07568; B66F 9/0755
USPC .................... 701/42; 180/443–447
See application file for complete search history.

(56) References Cited

U.S. PATENT DOCUMENTS 5,032,999 A * 7/1991 Finger et al. .................... 701/41
5,528,497 A    6/1996 Yamamoto et al.
5,828,972 A   10/1998 Asanuma et al.
6,176,341 B1 * 1/2001 Ansari ......................... 180/402
6,807,471 B2 10/2004 Fujimori
(Continued)

FOREIGN PATENT DOCUMENTS

DE    102004040975 A1    3/2006
JP    U-63-037381        3/1988
(Continued)

OTHER PUBLICATIONS

International Search Report issued in Application No. PCT/JP2011/063380; Dated Sep. 13, 2011 (With Translation).
(Continued)

Primary Examiner — Mary Cheung
Assistant Examiner — Anne Mazzara
(74) Attorney, Agent, or Firm — Oliff PLC

(57) ABSTRACT

A motor vehicle steering system includes a knob for rotationally manipulating a steering member and a knob reaction force actuator for giving a reaction force in response to the rotation of the knob. The knob has a knob center and is supported by the steering member in a manner rotatable about the knob center. Holding the knob and manipulating the steering member causes the knob to rotate (spin) about the knob center as the steering member rotates. The knob reaction force actuator then gives an appropriate reaction force in response to the rotation (spinning) of the knob.

15 Claims, 11 Drawing Sheets

(56) References Cited

U.S. PATENT DOCUMENTS

2003/0028306 A1    2/2003   Fujimori
2003/0184518 A1   10/2003   Numata et al.
2007/0260375 A1*  11/2007   Hilton .............................. 701/35

FOREIGN PATENT DOCUMENTS

| JP | A-05-105100   | 4/1993  |
| JP | 07-232647 A   | 9/1995  |
| JP | A-07-232647   | 9/1995  |
| JP | A-10-244951   | 9/1998  |
| JP | A-11-115778   | 4/1999  |
| JP | A-2001-10523  | 1/2001  |
| JP | A-2003-295959 | 10/2003 |
| JP | A-2005-28510  | 2/2005  |
| JP | A-2005-115805 | 4/2005  |
| JP | A-2005-231412 | 9/2005  |
| JP | A-2006-251845 | 9/2006  |
| JP | A-2007-253640 | 10/2007 |
| JP | B2-3991632    | 10/2007 |
| JP | A-2010-235026 | 10/2010 |

OTHER PUBLICATIONS

International Preliminary Report on Patentability issued in Application No. PCT/JP2011/063380; Dated Jan. 15, 2013 (With Translation).

* cited by examiner

FIG. 8
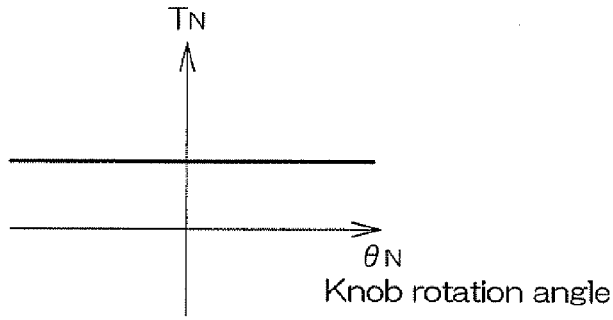
FIG. 9
9A 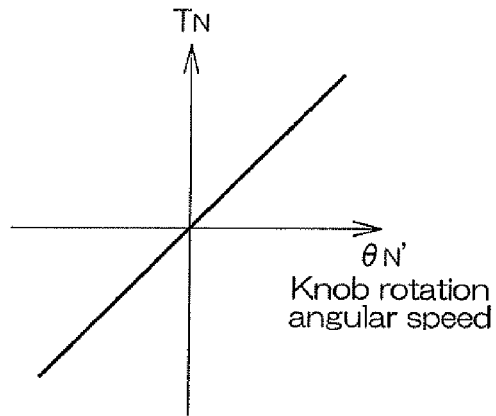
9B 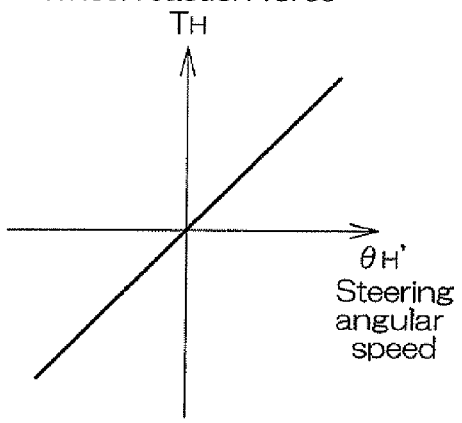

MOTOR VEHICLE STEERING SYSTEM

TECHNICAL FIELD

The present invention relates to a motor vehicle steering system.

BACKGROUND ART

There has been proposed a motor vehicle handle position correction apparatus for use in so-called steer-by-wire systems, in which a handle (steering wheel) and a steered wheel are mechanically decoupled, for correcting the gap between the handle position (the knob position with respect to the circumferential direction of the steering wheel) and the tire steered angle (see Patent Document 1 below, for example).

There has also been proposed a power steering apparatus for industrial vehicles provided with a sensor for detecting contact to a handle and/or a knob and arranged to activate an electric motor for power steering only when a driver holds the handle and/or the knob (see Patent Document 2 below, for example).

There has further been proposed a steer-by-wire steering system arranged to detect the position of a driver's hand holding a steering wheel using a camera and to correct the steering reaction force of the steering wheel according to the position of the driver's hand (see Patent Document 3 below, for example).

RELATED ART

Patent Documents

Patent Document 1: Japanese Patent No. 3991632 (see Paragraphs 66 to 69 in the Description and FIGS. 6 and 8)
Patent Document 2: Japanese Published Unexamined Utility Model Application No. Sho 63-37381 (see FIGS. 1 and 4)
Patent Document 3: Japanese Published Unexamined Patent Application No. 2007-253640 (see FIGS. 5 and 6)

SUMMARY OF THE INVENTION

Problems to be Solved by the Invention

In general, loading vehicles such as forklifts and motor vehicles for people with disabilities include a rotatable knob provided on a handle for single-handed handle (steering wheel) operation. For example, loading vehicle drivers manipulate a lever for loading operation with their right hand, while holding a knob and manipulating a handle with their left hand.

Drivers may alternately manipulate the handle and the knob at short intervals. In this case, it is desirable to give an appropriate steering reaction force regardless of such an alternate manipulation.

It is therefore an object of the present invention to provide a motor vehicle steering system capable of giving an appropriate steering reaction force in response to knob-based steering. It is another object of the present invention to provide a motor vehicle steering system capable of giving an appropriate steering reaction force even in the case of switching between knob-based steering and steering wheel-based steering.

Means for Solving the Problems

In order to achieve the foregoing objects, an aspect of the present invention provides a motor vehicle steering system (9) including: a knob (51) for rotationally manipulating a steering member (10); and a knob reaction force actuator (12, 84) for giving a reaction force in response to the rotation of the knob, in which the knob has a knob center (C3) and is supported by the steering member in a manner rotatable about the knob center.

According to the present aspect, holding the knob and manipulating the steering member causes the knob to rotate (spin) about the knob center as the steering member rotates. The knob reaction force actuator then gives a reaction force in response to the rotation (spinning) of the knob, which can give an appropriate steering reaction force in response to knob-based steering.

It is noted that alphanumeric characters in parentheses represent corresponding components, etc., according to embodiments to be described hereinafter, which does not obviously mean that the present invention should be restricted to the embodiments. The same applies to the following description in this section.

The knob reaction force actuator may include an electric motor, and the system may further include control means (100) for performing reaction force control of controlling the reaction force by the knob reaction force actuator. In this case, it is possible to appropriately control the reaction force given to the knob.

The system may further include knob position detection means (71) for detecting the position of the knob about the knob center, and the control means may be arranged to control the reaction force by the knob reaction force actuator based on the position of the knob about the knob center detected by the knob position detection means.

A driver holding the knob and rotating the steering member causes the knob to rotate (spin) about the knob center with respect to the steering member at an angle (knob rotation angle $\theta_N$) equal to the rotation angle (steering angle $\theta_H$) of the steering member in a direction opposite to the rotation direction of the steering member. Therefore, the reaction force given based on the detected position of the knob (knob rotation angle $\theta_N$) can also be based on the steering angle. For example, a reaction force proportional to the steering angle may be given to the knob.

The system may further include knob rotation speed detection means (102) for detecting the rotation speed ($\theta_N'$) of the knob about the knob center, and the control means may be arranged to control the reaction force by the knob reaction force actuator based on the rotation speed of the knob detected by the knob rotation speed detection means. The higher the rotation speed of the knob, the higher the rotation speed of the steering member accordingly, which may cause the motor vehicle to be swayed centrifugally to result in an unstable behavior of the motor vehicle. To address this problem, in the present aspect, a reaction force is given based on the rotation (spinning) speed of the knob, which corresponds to the rotation speed of the steering member, whereby it is possible to stabilize the behavior of the motor vehicle. If the angle of the driver's wrist manipulating the knob is constant, the rotation speed of the knob is approximately equal to the rotation speed of the steering member. Therefore, the knob rotation speed detection means may detect the rotation speed of the knob based on the rotation speed of the steering member.

The system may further include holding detection means (75) for detecting the knob being held, and the control means may be arranged to perform reaction force control for the knob reaction force actuator under the condition that the holding detection means detects the knob being held. In this case, when the knob is held for steering, a reaction force can be given to the knob reliably.

In addition, the steering member may include a steering wheel (52) with the knob rotatably supported thereon, and the system may further include a wheel reaction force actuator (13) for giving a reaction force in response to the rotation of the steering wheel, and the control means is arranged to perform reaction force control for the wheel reaction force actuator regardless of whether or not the control means performs reaction force control for the knob reaction force actuator.

In the case above, an appropriate reaction force is given response to the rotation of the wheel serving as a base regardless of whether or not the driver holds the knob for steering, that is, regardless of whether or not the control means performs reaction force control for the knob reaction force actuator. This allows drivers accustomed to a conventional steering feeling to be less likely to feel any physical disorder.

Alternatively, the steering member may include a steering wheel (52) with the knob rotatably supported thereon, and the system may further include a knob support (86) fixed to the steering wheel to support the knob, and the knob reaction force actuator may be a rotary damper (84) provided between the knob support and the knob and capable of giving a reaction force caused by viscous resistance in response to the rotation of the knob about the knob center.

In the case above, a viscous resistance can be given in response to the rotation (spinning) of the knob. That is, a reaction force can be given automatically based on the rotation speed of the knob with no control.

In addition, the knob may be supported by the knob support in a manner movable in a predetermined direction along the knob center, and the rotary damper may include a damper element (98) coupled rotatably to the knob support and arranged to generate the viscous resistance while rotating with respect to the knob, and the system may further include a clutch (85) capable of providing switching between a state of restricting and a state of not restricting the rotation of the damper element as the knob moves in the predetermined direction. In this case, the clutch functions to provide switching between a state of giving and a state of not giving the knob the reaction force by the rotary damper.

Further, the steering member and a steered wheel (6) may be mechanically decoupled. In this case, an appropriate steering reaction force can be given in response to knob-based steering in so-called steer-by-wire motor vehicle steering systems.

BRIEF DESCRIPTION OF THE DRAWINGS

FIG. 8 is a map showing the relationship between the knob rotation angle $\theta_N$ and the knob reaction force $T_N$ according to another embodiment of the present invention.

FIG. 9A is a map showing the relationship between the knob rotation angular speed $\theta_N'$ and the knob reaction force $T_N$, and FIG. 9B is a map showing the relationship between the steering angular speed $\theta_H'$ and the wheel reaction force $T_N$ according to still another embodiment of the present invention.

MODES FOR CARRYING OUT THE INVENTION

Preferred embodiments of the present invention will hereinafter be described with reference to the accompanying drawings.

Figure 1:
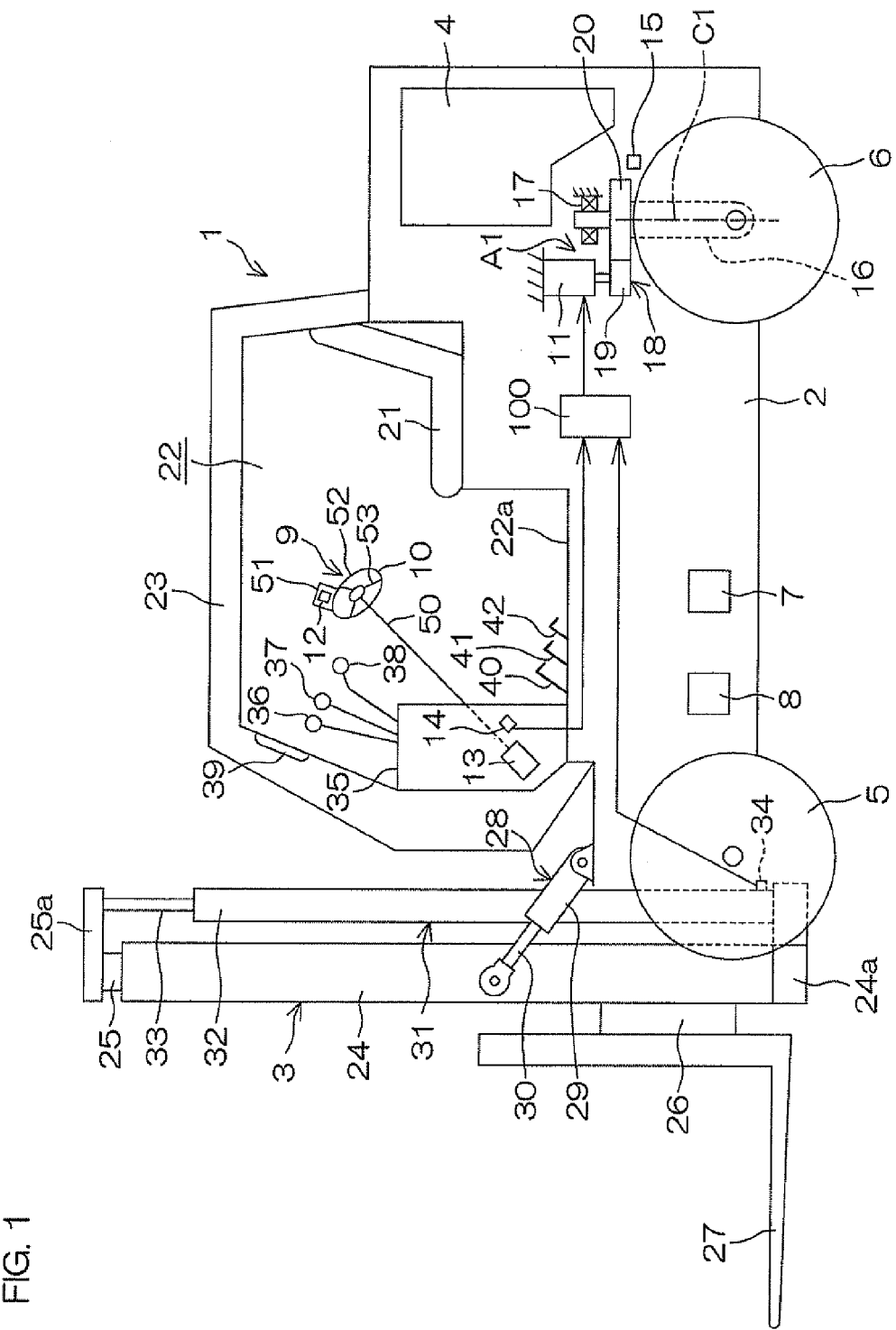
FIG. 1 is a schematic side view showing a general configuration of a forklift to which a motor vehicle steering system according to an embodiment of the present invention is applied.

FIG. 1 is a schematic side view showing a general configuration of a forklift to which a motor vehicle steering system according to an embodiment of the present invention is applied. Referring to FIG. 1, the forklift 1 includes a vehicle body 2, a loading apparatus 3 provided in front of the vehicle body 2, and a counter weight 4 provided in the rear of the vehicle body 2. The forklift 1 further includes a front wheel 5 serving as a drive wheel and a rear wheel 6 serving as a steered wheel for supporting the vehicle body 2, a drive source 7 including, for example, an engine, a hydraulic pump 8 serving as a hydraulic source, and a motor vehicle steering system 9 for steering the rear wheel 6.

The motor vehicle steering system 9 is constructed as a so-called steer-by-wire motor vehicle steering system in which a steering member 10 serving as a hand-turned handle and the rear wheel 6 serving as a steered wheel are mechanically decoupled. As such a steered wheel, a single rear wheel 6 may be provided at the lateral center of the vehicle body 2 or two rear wheels 6 may be provided, respectively, on the left and right sides of the vehicle body 2. The steering member 10 is coupled to the upper end of a tilted steering shaft 50 in an integrally rotatable manner. A knob 51 for manipulating the steering member 10 is also attached rotatably to the steering member 10.

The motor vehicle steering system 9 includes the steering member 10 and a steering actuator 11 constituted by, for example, an electric motor for steering the rear wheel 6 serving as a steered wheel in response to the manipulation of the steering member 10 and arranged to be driven and controlled by an ECU 100 (Electronic Control Unit) serving as control means. The motor vehicle steering system 9 also includes a knob reaction force actuator 12 for giving a reaction force to the knob 51 that is attached rotatably to the steering member 10 and a wheel reaction force actuator 13 for giving a wheel reaction force (steering reaction force) to the steering wheel 52 of the steering member 10. In this preferred embodiment, the knob reaction force actuator 12 and the wheel reaction force actuator 13 are each constituted by an electric motor and arranged to be driven and controlled by the ECU 100.

The motor vehicle steering system 9 further includes a steering angle sensor 14 for detecting the steering angle of the steering member 10 and a steered angle sensor 15 for detecting the steered angle of the rear wheel 6. The rear wheel 6 serving as a steered wheel is supported rotatably by an approximately vertical support member 16. The support member 16 is in turn supported rotatably about an approximately vertical rotational axis C1 via a bearing 17 held on the vehicle body 2.

The rotation of the output shaft of the steering actuator 11 is decelerated via a transmission mechanism 18 and transmitted to the support member 16. The transmission mechanism 18 has a driving member 19 constituted by, for example, a driving gear and arranged to rotate together with the output shaft of the steering actuator 11 and a driven member 20 constituted by, for example, a driven gear engageable with the driving gear and provided around the rotational axis C1 in a manner rotatable together with the support member 16. The transmission mechanism 18 and the steering actuator 11 constitute a steering mechanism A1.

Power from the drive source 7 including an engine, etc., is transmitted through a torque converter to a transmission for switching forward and backward traveling and changing speed and further transmitted through a differential gear to the left and right front wheels 5 (drive wheels), though not shown. The transmission incorporates a forward clutch and a backward clutch.

The forklift 1 includes an operator's cab 22 with a driver's seat 21 provided therein. The operator's cab 22 is formed on the vehicle body 2 in a manner surrounded by a frame 23.

The loading apparatus 3 includes a pair of left and right outer masts 24 supported by the vehicle body 2 in a manner tiltable centering on a lower end portion 24a and inner masts 25 supported by the outer masts 24 in a manner movable up and down. The loading apparatus 3 also includes lift brackets 26 supported by the outer masts 24 in a manner movable up and down and a pair of left and right forks 27 attached to the lift brackets 26 to serve as a loading base.

A tilt cylinder 28 is provided between a given portion of each outer mast 24 and a given portion of the vehicle body 2. The tilt cylinder 28 has a cylinder main body 29 with one end coupled swingably to the given portion of the vehicle body 2 and a rod 30 protruding from the other end of the cylinder main body 29. The leading end of the rod 30 is coupled swingably to the given portion of the outer mast 24. As the rod 30 of the tilt cylinder 28 expands and contracts, the outer mast 24 is displaced into an upright position and a tilted position.

There is also provided a lift cylinder 31 for moving each inner mast 25 up and down using the outer mast 24 as a guide. The lift cylinder 31 has a cylinder main body 32 fixed to the outer mast 24 and a rod 33 protruding from the cylinder main body 32. The leading end of the rod 33 is fixed to an attachment 25a provided in a given portion of the inner mast 25.

A load sensor 34 serving as load detection means for detecting the loading load on the loading apparatus 3 is attached to the lower part of the cylinder main body 32 of the lift cylinder 31. A signal from the load sensor 34 is to be input to the ECU 100.

In the front of the operator's cab 22, a manipulation platform 35 is provided on the bottom surface 22a of the operator's cab 22, while the driver's seat 21 is fixed in the rear of the operator's cab 22.

Multiple manipulation members to be manipulated by driver's hands are provided on the manipulation platform 35, including the steering member 10, an up-and-down manipulation lever 36 for moving the forks 27 up and down, a tilt manipulation lever 37 for swinging the outer masts 24, and a forward/backward traveling switching lever 38. A sight mirror 39 mainly for rear viewing is fixed to the manipulation platform 35. Various switches not shown are also provided on the manipulation platform 35.

In the vicinity of the base of the manipulation platform 35, multiple manipulation members to be manipulated by the driver's feet are provided on the bottom surface 22a of the operator's cab 22, including an accelerator pedal 40, a brake pedal 41, and a clutch pedal 42. The accelerator pedal 40, brake pedal 41, and clutch pedal 42 are actually arranged side by side in the direction perpendicular to the paper face (i.e. in the lateral direction of the vehicle), but shown schematically in FIG. 1. The layout of the up-and-down manipulation lever 36, tilt manipulation lever 37, and forward/backward traveling switching lever 38, which serve as manipulation members, are also shown schematically in FIG. 1.

Figure 2:
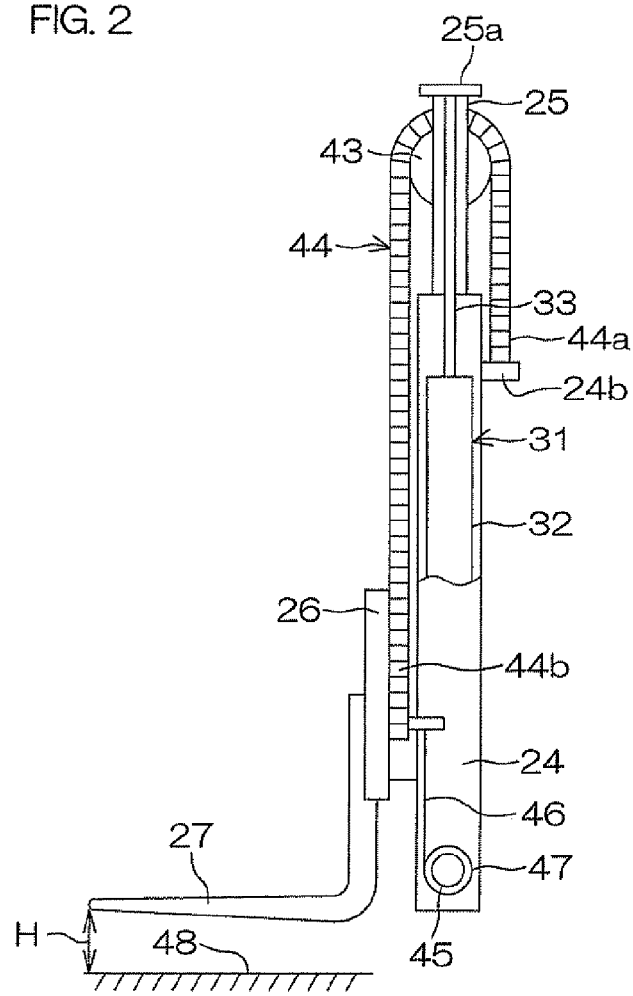
FIG. 2 is a schematic view illustrating the principle of operation of moving up and down a fork.

Referring to FIG. 2, conceptually illustrating the principle of operation of moving up and down each fork 27, a sprocket 43 is supported rotatably in the upper part of the inner mast 25, and a chain 44 is looped around the sprocket 43. One end 44a of the chain 44 is fixed to a fixture 24b provided on the outer mast 24, while the other end 44b of the chain 44 is fixed to the lift bracket 26. With this arrangement, the lift bracket 26 and the fork 27 are suspended using the chain 44.

When the inner mast 25 moves up as the rod 33 of the lift cylinder 31 expands, the sprocket 43 also moves up with respect to the fixture 24b of the outer mast 24, which causes the lift bracket 26 and the fork 27 serving as a loading base to move up via the chain 44. The amount of lift of the fork 27 from the ground 48 is twice the amount of expansion of the rod 33 of the lift cylinder 31.

There is provided a stroke sensor 45 serving as loading base height detection means for detecting the height of the fork 27 serving as a loading base, and a signal from the stroke sensor 45 is to be input to the ECU 100. The stroke sensor 45 may employ a rotary encoder.

Specifically, a wire 46 one end of which is retained at the other end 44b of the chain 44 is wound around a wire drum 47 that is supported rotatably on the outer mast 24. As the other end 44b of the chain 44 moves up and down with the fork 27, the wire 46 is withdrawn from and rewound around the wire drum 47. At this time, the ECU 100 detects the number of rotations of the wire drum 47 with a rotary encoder serving as the stroke sensor 45 and, based on the detected value, calculates the amount of withdrawal of the wire 46 from the wire drum 47 and further, based on the calculated value, detects the loading base height H, i.e., the height of the fork 27 from the ground 48.

Figure 3:
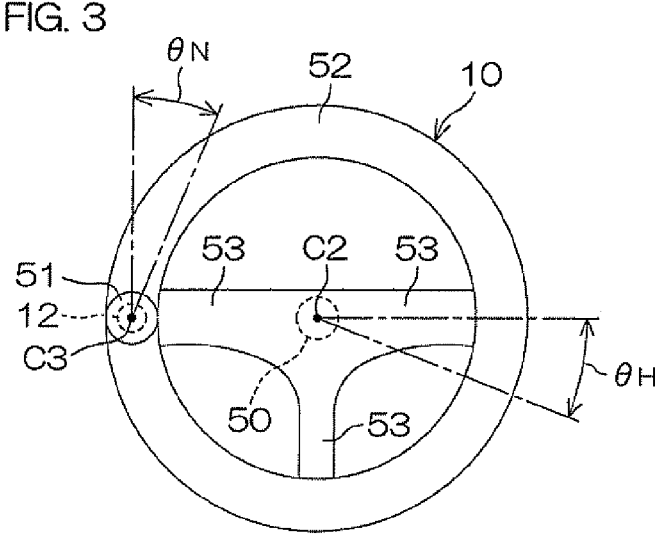
FIG. 3 is a schematic front view of a steering member, viewed along the wheel center of the steering member.
Figure 4:
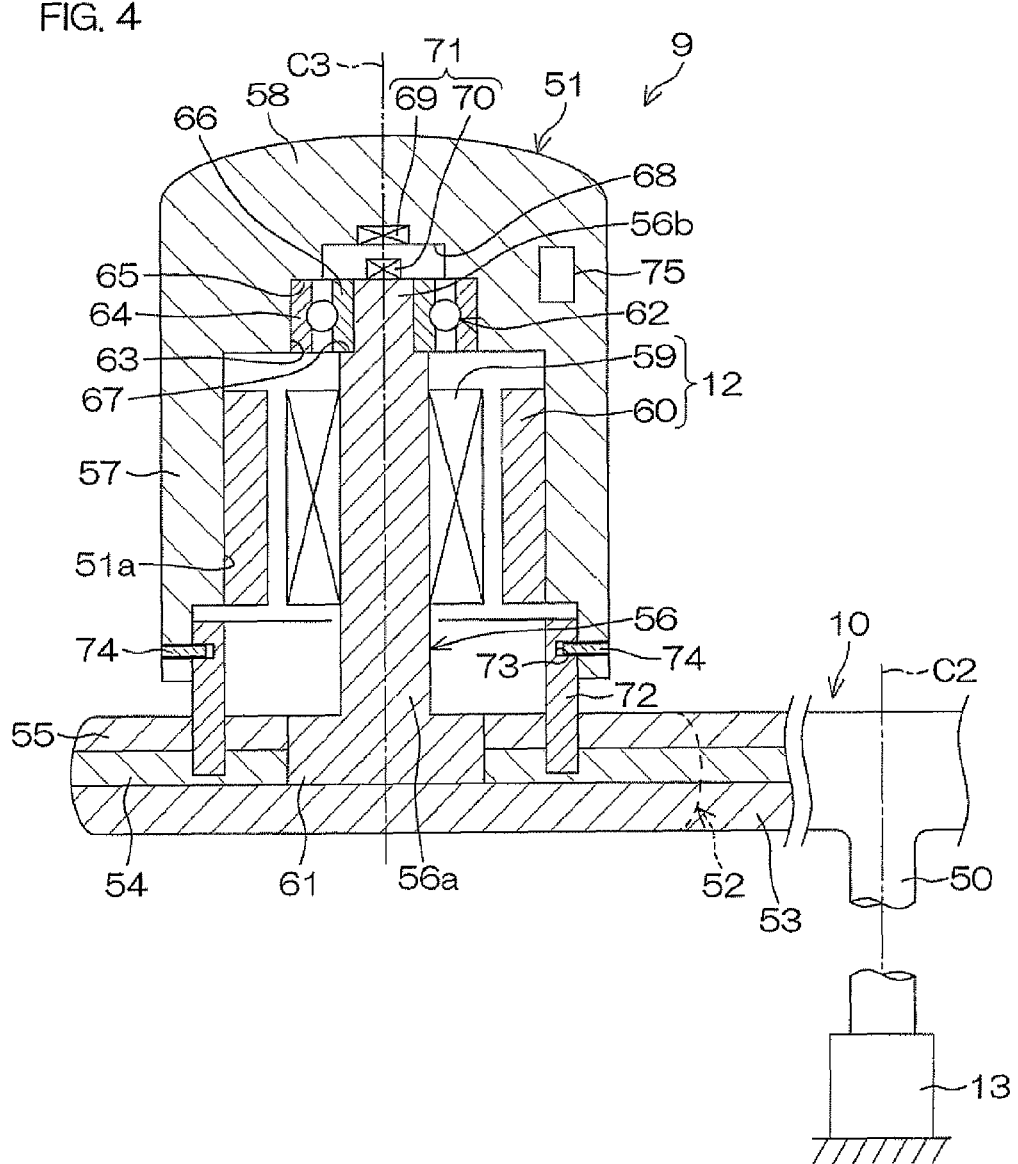
FIG. 4 is a schematic cross-sectional view of the steering member and a knob.

FIG. 3 is a front view of the steering member 10, and FIG. 4 is a schematic side view of a substantial part of the steering member 10. Referring to FIGS. 3 and 4, the steering member 10 is coupled to the upper end of the tilted steering shaft 50 in an integrally rotatable manner. The steering member 10 has a steering wheel 52 with the knob 51 rotatably supported thereon and multiple spokes 53 coupling the steering wheel 52 to the upper end of the steering shaft 50.

The knob 51 is arranged to be positioned on the left side of the steering wheel 52 when the steering member 10 is in a steering neutral position. Generally, drivers hold the knob 51 to rotationally manipulate the steering member 10. The knob 51 is rotatable about a knob center C3 parallel with the central axis C2 (corresponding to the central axis of the steering shaft 50) of the steering member 10 (steering wheel 52).

The steering wheel 52 of the steering member 10 has an annular core metal 54 coupled to the spokes 53 and a cover 55 made of, for example, synthetic resin for covering the core metal 54. A knob spindle 56 serving as a knob support that has a central axis corresponding to the knob center C3 is fixed to the core metal 54.

The knob 51 has a hollow shape such as a cylindrical one opened downward. That is, the knob 51 has a cylindrical portion 57 and an end wall 58 closing the upper end of the cylindrical portion 57. The knob reaction force actuator 12 is housed inside the knob 51.

Specifically, the knob reaction force actuator 12 includes a stator 59 fixed to the outer periphery of the knob spindle 56 and a rotor 60 surrounding the stator 59 and fixed to the inner periphery 51a of the knob 51 (inner periphery of the cylindrical portion 57).

The knob spindle 56 has at one end 56a thereof a larger-diameter base 61 fixed to the core metal 54 of the steering wheel 52. The smaller-diameter other end 56b of the knob spindle 56 supports the knob 51 rotatably via a bearing 62.

The bearing 62 is held in a bearing holder 63 provided in the end wall 58 of the knob 51. An outer wheel 64 of the bearing 62 is in contact with a positioning stepped portion 65 at one end of the bearing holder 63, so that the axial movement with respect to the knob 51 is restricted. On the other hand, an inner wheel 66 of the bearing 62 is in contact with a positioning stepped portion 67 at the other end 56b of the knob spindle 56, so that the axial movement with respect to the knob spindle 56 is restricted. This restricts the movement of the knob 51 toward the one end 56a of the knob spindle 56.

A recessed portion 68 opposed to the end face at the other end 56b of the knob spindle 56 is provided in the end wall 58 of the knob 51. A knob position sensor 71 serving as knob position detection means for detecting the rotational position of the knob 51 about the knob center C3 (knob rotation angle $\theta_N$) is constituted by a movable portion 69 fixed to the bottom of the recessed portion 68 and a fixed portion 70 fixed to the end face at the other end 56b of the knob spindle 56 and opposed to the movable portion 69. The knob position sensor 71 may employ, for example, a rotary encoder for detecting the amount of relative rotation between the movable portion 69 and the fixed portion 70.

To the core metal 54 of the steering wheel 52 of the steering member 10 is fixed a guide cylinder 72 centering on the knob center C3. The inner periphery of the cylindrical portion 57 of the knob 51 is fitted rotatably on the outer periphery of the guide cylinder 72. In the outer periphery of the guide cylinder 72 is formed a circumferential guide groove 73. A pin 74 penetrating and fixed to the cylindrical portion 57 of the knob 51 is engaged with the guide groove 73. The pin 74 is rotatable in the circumferential direction of the guide cylinder 72 along the guide groove 73. The pin 74 also functions as a retaining pin for preventing the knob 51 from disengaging from the guide cylinder 72.

In the knob 51, a holding sensor 75 constituted by, for example, an electrostatic sensor is arranged as holding detection means for detecting the knob 51 being held by a driver. When the driver holds the knob 51, the holding sensor 75 outputs a signal to the ECU 100 based on the change in the electrostatic capacity. Signal lines of the knob position sensor 71 and the holding sensor 75 and power supply lines of the knob reaction force actuator 12 constituted by an electric motor are guided out of the knob 51 through a known slip ring or the like.

Figure 5:
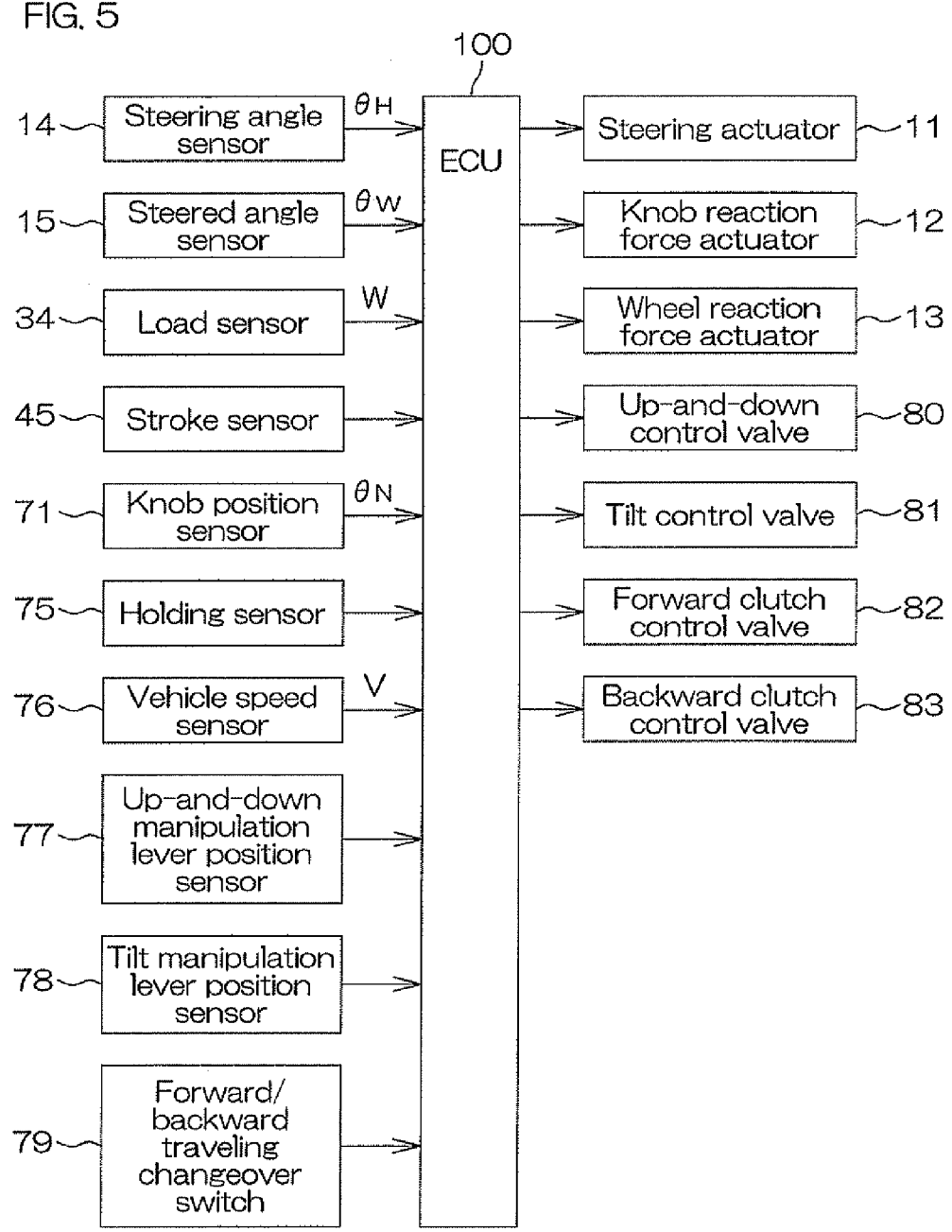
FIG. 5 is a block diagram showing an electrical configuration of the forklift.

FIG. 5 is a block diagram showing a major electrical configuration of the forklift 1. Referring to FIG. 5, signals are input to the ECU 100 from the steering angle sensor 14 for detecting the steering angle $\theta_H$ of the steering member 10, the steered angle sensor 15 for detecting the steered angle $\theta_N$ of the rear wheel 6 serving as a steered wheel, and the load sensor 34 serving as load detection means for detecting the loading load W on the forks 27 serving as a loading base. Signals are also input to the ECU 100 from the stroke sensor 45 serving as loading base height detection means for detecting the loading height H of the forks 27 serving as a loading base, the knob position sensor 71 for detecting the knob rotation angle $\theta_N$ about the knob center C3, and the holding sensor 75 for detecting the knob 51 being held. Signals are further input to the ECU 100 from a vehicle speed sensor 76 for detecting the vehicle speed V, an up-and-down manipulation lever position sensor 77 for detecting the position of the up-and-down manipulation lever 36, a tilt manipulation lever position sensor 78 for detecting the position of the tilt manipulation lever 37, and a forward/backward traveling changeover switch 79 arranged to operate in response to the switching of the forward/backward traveling switching lever 38.

Signals are output from the ECU 100 to the steering actuator 11, knob reaction force actuator 12, wheel reaction force actuator 13, and an up-and-down control valve 80 constituted by an electromagnetic proportional control valve for controlling the supply of hydraulic oil from the hydraulic pump 8 to the lift cylinder 31. Signals are also output from the ECU 100 to a tilt control valve 81 constituted by an electromagnetic proportional control valve for controlling the supply of hydraulic oil from the hydraulic pump 8 to the tilt cylinder 28, a forward clutch control valve 82 constituted by an electromagnetic proportional control valve for controlling the supply of hydraulic oil to a hydraulic cylinder for engaging/disengaging the forward clutch, and a backward clutch control valve 83 constituted by an electromagnetic proportional control valve for controlling the supply of hydraulic oil to a hydraulic cylinder for engaging/disengaging the backward clutch.

The ECU 100 is arranged to perform various types of control. For example, based on the position of the up-and-down manipulation lever 36 input from the up-and-down manipulation lever position sensor 77, the ECU 100 outputs a control signal to the up-and-down control valve 80 for controlling the supply of hydraulic oil from the hydraulic pump 8 to the lift cylinder 31.

Also, based on the position of the tilt manipulation lever 37 input from the tilt manipulation lever position sensor 78, the ECU 100 outputs a control signal to the tilt control valve 81 for controlling the supply of hydraulic oil from the hydraulic pump 8 to the tilt cylinder 28.

In addition, the ECU 100 outputs a control signal to the forward clutch control valve 82 in response to the switching of the forward/backward traveling changeover switch 79 forward so that hydraulic oil is supplied from the hydraulic pump 8 to a hydraulic cylinder for operating the forward clutch.

Further, the ECU 100 outputs a control signal to the backward clutch control valve 83 in response to the switching of the forward/backward traveling changeover switch 79 backward so that hydraulic oil is supplied from the hydraulic pump 8 to a hydraulic cylinder for operating the backward clutch.

Also, based on the knob rotation angle $\theta_N$ input from the knob position sensor 71, the ECU 100 may drive and control the knob reaction force actuator 12 (i.e. perform reaction force control for the knob reaction force actuator 12) to make the knob reaction force actuator 12 generate a torque for giving a reaction force according to the position of the knob 51 about the knob center C3 to the knob 51. Further, based on the steering angle $\theta_H$ input from the steering angle sensor 15, the ECU 100 may drive and control the wheel reaction force actuator 13 (i.e. perform reaction force control for the wheel reaction force actuator 13) to make the wheel reaction force actuator 13 generate a torque for giving a steering reaction force according to the steering angle $\theta_H$ of the steering member 10 to the steering wheel 52 of the steering member 10.

Figure 6:
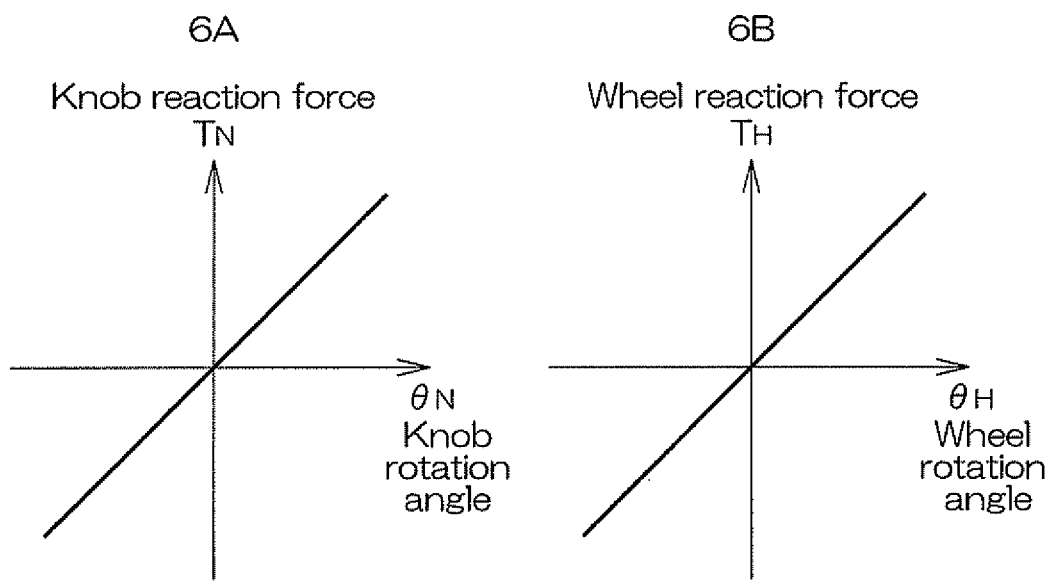
FIG. 6A is a map showing the relationship between the knob rotation angle $\theta_N$ and the knob reaction force $T_N$.
FIG. 6B is a map showing the relationship between the steering angle $\theta_H$ and the knob reaction force $T_N$.

Specifically, the ECU 100 stores the relationship between the knob rotation angle $\theta_N$ and the knob reaction force $T_N$ as, for example, a map of knob rotation angle vs. knob reaction force shown in FIG. 6A. For example, the knob reaction force $T_N$ increases in proportion to the knob rotation angle $\theta_N$ in the example of FIG. 6A. The ECU 100 also stores the relationship between the steering angle $\theta_H$ of the steering member 10 and the wheel reaction force $T_H$ (steering reaction force) as, for example, a map of steering angle vs. wheel reaction force shown in FIG. 6B.

Figure 7:
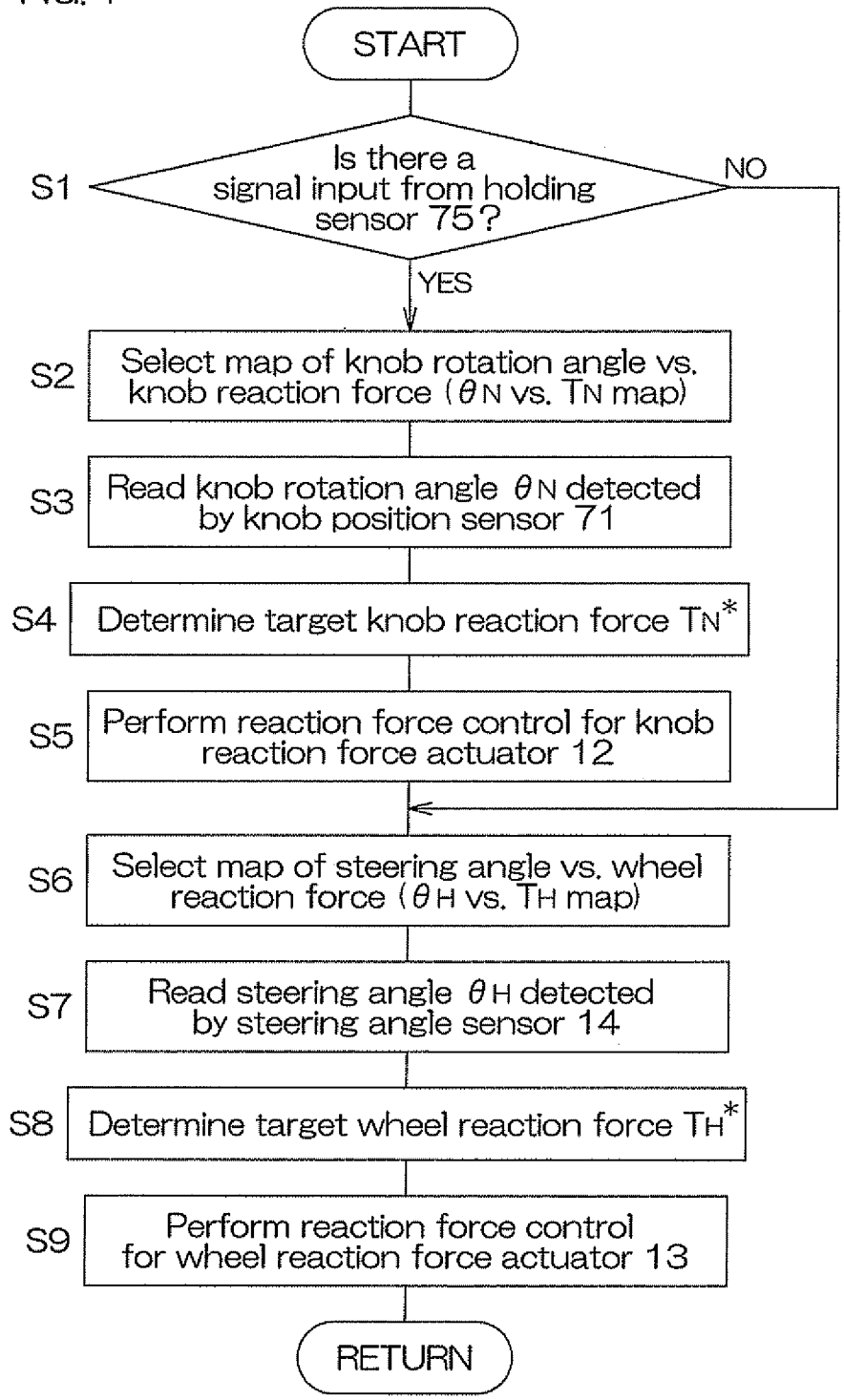
FIG. 7 is a flow chart showing the flow of main control by an ECU.

FIG. 7 is a flow chart showing a major operation of the ECU 100. Referring to FIG. 7, the ECU 100 first detects whether or not there is a signal input from the holding sensor 75 (step S1) and, if there is a signal input from the holding sensor 75 (YES in step S1), advances the routine to step S2 to select a map of knob rotation angle vs. knob reaction force shown in FIG. 6A.

Next, the ECU 100 reads a knob rotation angle $\theta_N$ obtained based on a signal from the knob position sensor 71 (step S3), uses the selected map of knob rotation angle vs. knob reaction force to obtain a knob reaction force $T_N$ based on the read knob rotation angle $\theta_N$, and determines the obtained knob reaction force $T_N$ as a target knob reaction force $T_N^*$ (step S4).

Based on the determined target knob reaction force $T_N^*$, the ECU 100 then drives and controls the knob reaction force actuator 12 (i.e. performs reaction force control for the knob reaction force actuator 12) (step S5).

The ECU 100 then advances the routine to step S6 to select a map of steering angle vs. wheel reaction force shown in FIG. 6B. Next, the ECU 100 reads a steering angle $\theta_H$ obtained based on a signal from the steering angle sensor 14 (step S7), uses the selected map of steering angle vs. wheel reaction force to obtain a wheel reaction force $T_H$ (i.e. a steering reaction force) based on the read steering angle $\theta_H$ (step S8), and determines the obtained wheel reaction force $T_H$ as a target wheel reaction force $T_H^*$.

Based on the determined target wheel reaction force $T_H^*$, the ECU 100 then drives and controls the wheel reaction force actuator 13 (i.e. performs reaction force control for the wheel reaction force actuator 13) (step S9).

As described above, if there is a signal input from the holding sensor 75, the ECU 100 performs both reaction force control for the knob reaction force actuator 12 and reaction force control for the wheel reaction force actuator 13.

On the contrary, if there is no signal input from the holding sensor 75 (NO in step S1), the ECU 100 skips steps S2 to S5 to advance the routine to step S6 and perform reaction force control for the wheel reaction force actuator 13 as shown in steps S6 to S9. In this case, no reaction force control is performed for the knob reaction force actuator 12.

According to this preferred embodiment, holding the knob 51 and manipulating the steering member 10 causes the knob 51 to rotate (spin) about the knob center C3 as the steering wheel 52 of the steering member 10 rotates. The knob reaction force actuator 12 then gives a reaction force in response to the rotation (spinning) of the knob 51, which can give an appropriate steering reaction force in response to steering using the knob 51.

In addition, since the knob reaction force actuator 12 is constituted by an electric motor, the reaction force control for the knob reaction force actuator 12 by the ECU 100 allows the reaction force given to the knob 51 to be controlled appropriately.

Further, a driver holding the knob 51 and rotating the steering member 10 causes the knob 51 to rotate (spin) about the knob center C3 with respect to the steering wheel 52 of the steering member 10 at an angle equal to the rotation angle (steering angle $\theta_H$) of the steering wheel 52 in a direction opposite to the rotation direction of the steering wheel 52. In this preferred embodiment, the knob position sensor 71 is provided to detect the position of the knob 51 about the knob center C3, and the reaction force by the knob reaction force actuator 12 is controlled based on the position of the knob 51 about the knob center C3 (knob rotation angle $\theta_N$) detected by the knob position sensor 71. This allows a reaction force according to the knob rotation angle $\theta_N$ to be given to the driver via the knob 51 as a reaction force corresponding to an actual reaction force from the ground.

Furthermore, the driver may not hold the knob 51 but hold the steering wheel 52 to manipulate the steering member 10. In this case, no control is required for changing the knob reaction force $T_N$ based on the position of the knob 51. Hence, the map of steering angle vs. wheel reaction force is used to perform reaction force control for the wheel reaction force actuator 13 and thereby to give an appropriate reaction force in response to the rotation of the steering wheel 52 serving as a base regardless of whether or not the ECU detects the knob 51 being held, that is, regardless of whether or not the ECU performs reaction force control for the knob reaction force actuator 12. This allows drivers accustomed to a conventional steering feeling to be less likely to feel any physical disorder and to manipulate the steering member easily.

It is noted that the map of knob rotation angle vs. knob reaction force shown in FIG. 6A may be corrected based on at least one of the knob rotation angular speed $\theta_N'$ (knob rotation speed) and the vehicle speed V. Specifically, the map of knob rotation angle vs. knob reaction force may be corrected such that the lower the knob rotation angular speed $\theta_N'$, which is obtained by differentiating the knob rotation angle $\theta_N$ obtained from the knob position sensor 71, and the lower the vehicle speed V, which is obtained from the vehicle speed sensor 76, the smaller the knob reaction force $T_N$ becomes. This can improve the manipulability of the knob 51.

On the contrary, the map of knob rotation angle vs. knob reaction force may be corrected such that the higher the knob rotation angular speed $\theta_N'$, which is obtained by differentiating the knob rotation angular speed $\theta_N'$ obtained from the knob position sensor 71, and the higher the vehicle speed V, which is obtained from the vehicle speed sensor 76, the greater the knob reaction force $T_N$ becomes. This can improve the driving safety of the forklift 1.

It is also noted that the map of steering angle vs. wheel reaction force shown in FIG. 6B may be corrected based on at least one of the steering angular speed $\theta_H'$ (steering speed) and the vehicle speed V. Specifically, the map of steering angle vs. wheel reaction force may be corrected such that the lower the steering angular speed $\theta_H'$, which is obtained by differentiating the steering angle $\theta_H$ obtained from the steering angle sensor 14, and the lower the vehicle speed V, which is obtained from the vehicle speed sensor 76, the smaller the wheel reaction force $T_H$ becomes. This can improve the manipulability of the steering member 10.

On the contrary, the map of steering angle vs. wheel reaction force may be corrected such that the higher the steering angular speed $\theta_H'$ (steering speed), which is obtained by differentiating the steering angle $\theta_H$ obtained from the steering angle sensor 14, and the higher the vehicle speed V, which is obtained from the vehicle speed sensor 76, the greater the wheel reaction force $T_H$ becomes. This can improve the driving safety of the forklift 1.

Although the knob reaction force $T_N$ is proportional to the knob rotation angle $\theta_N$ in the embodiment shown in FIG. 6A, the knob reaction force $T_N$ may be instead constant independently of the knob rotation angle $\theta_N$ as shown in FIG. 8. In this case, the knob position sensor 71 may be removed.

In the embodiment shown in FIG. 6A, if the angle of the driver's wrist manipulating the knob 51 is constant, the knob rotation angle $\theta_N$ is approximately equal to the steering angle $\theta_H$. Also, the rotation angular speed of the knob 51 is approximately equal to the rotation speed of the steering wheel 52 of the steering member 10. Therefore, the steering angle sensor 14 may be substituted for the knob position sensor 71. In addition, the steering angular speed $\theta_H'$ (steering speed), which is obtained by differentiating the steering angle $\theta_H$, may be used as the rotation speed of the knob 51.

Although the knob reaction force $T_N$ given to the knob 51 is proportional to the knob rotation angle $\theta_N$ and the knob reaction force $T_N$ is proportional to the steering angle $\theta_H$ in the embodiment shown in FIGS. 6A and 6B, the knob reaction force $T_N$ given to the knob 51 may be instead altered depending on (e.g. proportional to) the knob rotation angular speed $\theta_N'$ as shown in the map of knob rotation angular speed vs. knob reaction force of FIG. 9A, while the wheel reaction force $T_H$ given to the steering wheel 52 of the steering member 10 may be instead altered depending on (e.g. proportional to) the steering angular speed $\theta_H'$ (steering speed) as shown in the map of steering angular speed vs. wheel reaction force of FIG. 9B.

Figure 10:
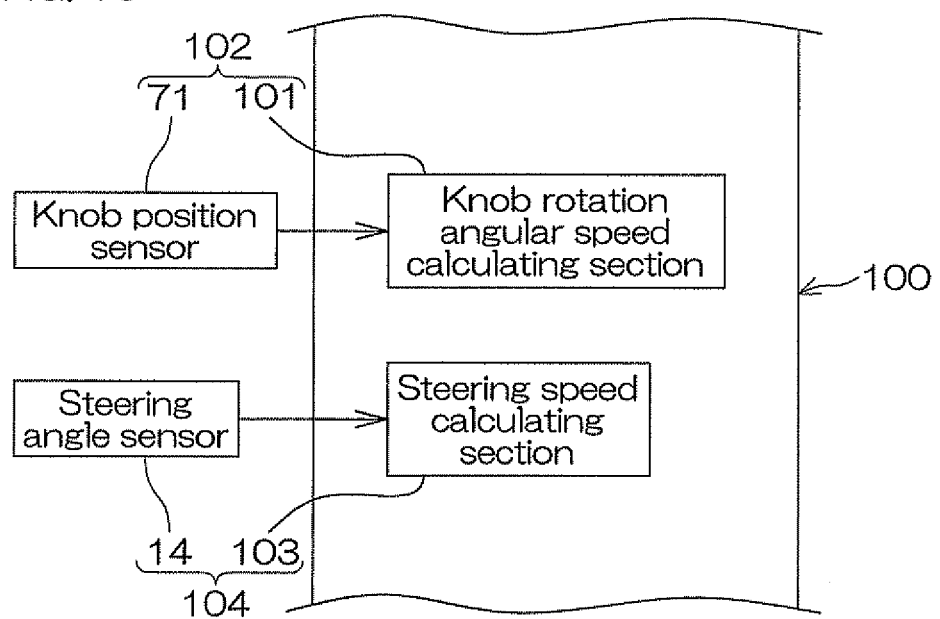
FIG. 10 is a schematic block diagram showing a substantial part of an electrical configuration of a motor vehicle steering system according to the embodiment shown in FIG. 9.

As shown in FIG. 10, the ECU 100 is provided with a knob rotation angular speed calculating section 101 for calculating the knob rotation angular speed $\theta_N'$ by differentiating the knob rotation angle $\theta_N$ obtained based on a signal from the knob position sensor 71. The knob position sensor 71 and the knob rotation angular speed calculating section 101 constitute a knob rotation angular speed detecting section 102. There is also provided a steering speed calculating section 103 for detecting the steering angular speed $\theta_H'$ (steering speed) by differentiating the steering angle $\theta_H$ obtained based on a signal from the steering angle sensor 14. The steering angle sensor 14 and the steering speed calculating section 103 constitute a steering speed detecting section 104.

Figure 11:
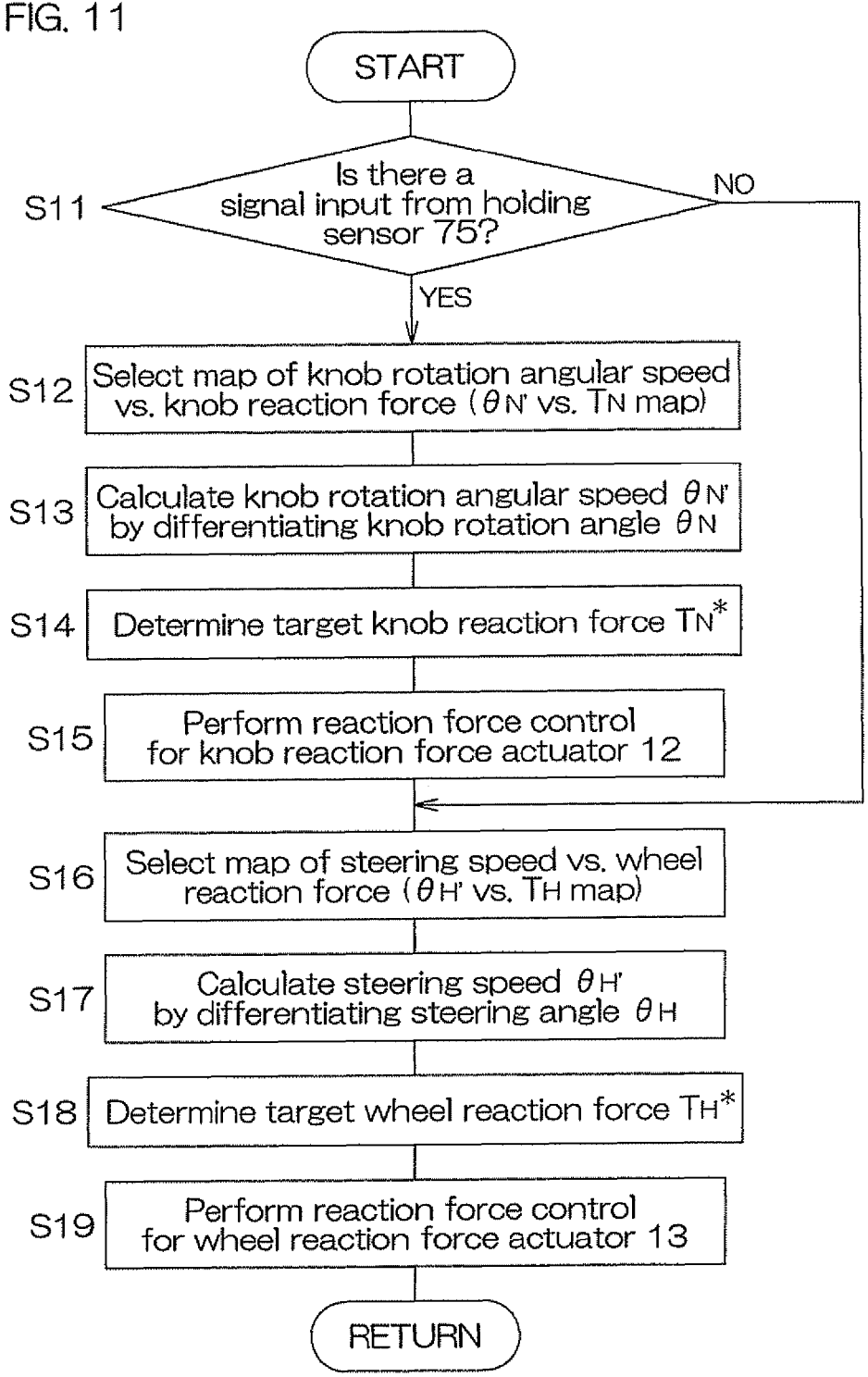
FIG. 11 is a flow chart showing the flow of main control by an ECU according to the embodiment shown in FIG. 9.

Specifically, as shown in the flow chart of FIG. 11, the ECU 100 first detects whether or not there is a signal input from the holding sensor 75 (step S11) and, if there is a signal input from the holding sensor 75 (YES in step S11), advances the routine to step S12 to select a map of knob rotation angular speed vs. knob reaction force shown in FIG. 9A.

Next, the ECU 100 calculates a knob rotation angular speed $\theta_N'$ by differentiating a knob rotation angle $\theta_N$ obtained based on a signal from the knob position sensor 71 (step S13), uses the selected map of knob rotation angular speed vs. knob reaction force to obtain a knob reaction force $T_N$ based on the calculated knob rotation angular speed $\theta_N'$, and determines the obtained knob reaction force $T_N$ as a target knob reaction force $T_N^*$ (step S14).

Based on the determined target knob reaction force $T_N^*$, the ECU 100 then drives and controls the knob reaction force actuator 12 (i.e. performs reaction force control for the knob reaction force actuator 12) (step S15).

The ECU 100 then advances the routine to step S16 to select a map of steering angular speed vs. wheel reaction force shown in FIG. 9B. Next, the ECU 100 calculates a steering angular speed $\theta_H'$ (steering speed) by differentiating a steering angle $\theta_H$ obtained based on a signal from the steering angle sensor 14 (step S17), uses the selected map of steering angular speed vs. wheel reaction force to obtain a wheel reaction force $T_H$ (i.e. steering reaction force) based on the calculated steering angular speed $\theta_H'$ (step S18), and determines the obtained wheel reaction force $T_H$ as a target wheel reaction force $T_H^*$.

Based on the determined target wheel reaction force $T_H^*$, the ECU 100 then drives and controls the wheel reaction force actuator 13 (i.e. performs reaction force control for the wheel reaction force actuator 13) (step S19).

As described above, if there is a signal input from the holding sensor 75, the ECU 100 performs both reaction force control for the knob reaction force actuator 12 and reaction force control for the wheel reaction force actuator 13.

On the contrary, if there is no signal input from the holding sensor 75 (NO in step S11), the ECU 100 skips steps S12 to S15 to advance the routine to step S16 and perform reaction force control for the wheel reaction force actuator 13 as shown in steps S16 to S19. In this case, no reaction force control is performed for the knob reaction force actuator 12.

According to this preferred embodiment, the knob reaction force actuator 12 gives a reaction force in response to the rotation (spinning) of the knob 51, which can give an appropriate steering reaction force in response to steering using the knob 51. In addition, since the knob reaction force actuator 12 is constituted by an electric motor, the reaction force control for the knob reaction force actuator 12 by the ECU 100 allows the reaction force given to the knob 51 to be controlled appropriately. Further, the reaction force control for the wheel reaction force actuator 13 is performed to give an appropriate reaction force in response to the rotation of the steering wheel 52 serving as a base regardless of whether or not the driver holds the knob 51. This allows drivers accustomed to a conventional steering feeling to be less likely to feel any physical disorder and to manipulate the steering member easily.

Furthermore, the knob reaction force $T_N$ is altered depending on the knob rotation angular speed $\theta_N'$ and the wheel reaction force $T_N$ is altered depending on the steering angular speed $\theta_H'$. For example, it is possible to improve the driving safety of the forklift 1 by increasing the knob reaction force $T_N$ with the increase in the knob rotation angular speed $\theta_N'$ as shown in FIG. 9A and increasing the wheel reaction force $T_N$ with the increase in the steering angular speed $\theta_H'$.

Although the knob reaction force $T_N$ is altered depending on the knob rotation angular speed $\theta_N'$ in the embodiment shown in FIG. 11, the knob reaction force $T_N$ may be instead altered depending on a vehicle behavior such as yaw rate (lateral acceleration of the vehicle). For example, it is possible to improve the driving safety of the forklift 1 by increasing the knob reaction force $T_N$ with the increase in the yaw rate.

Figure 12:
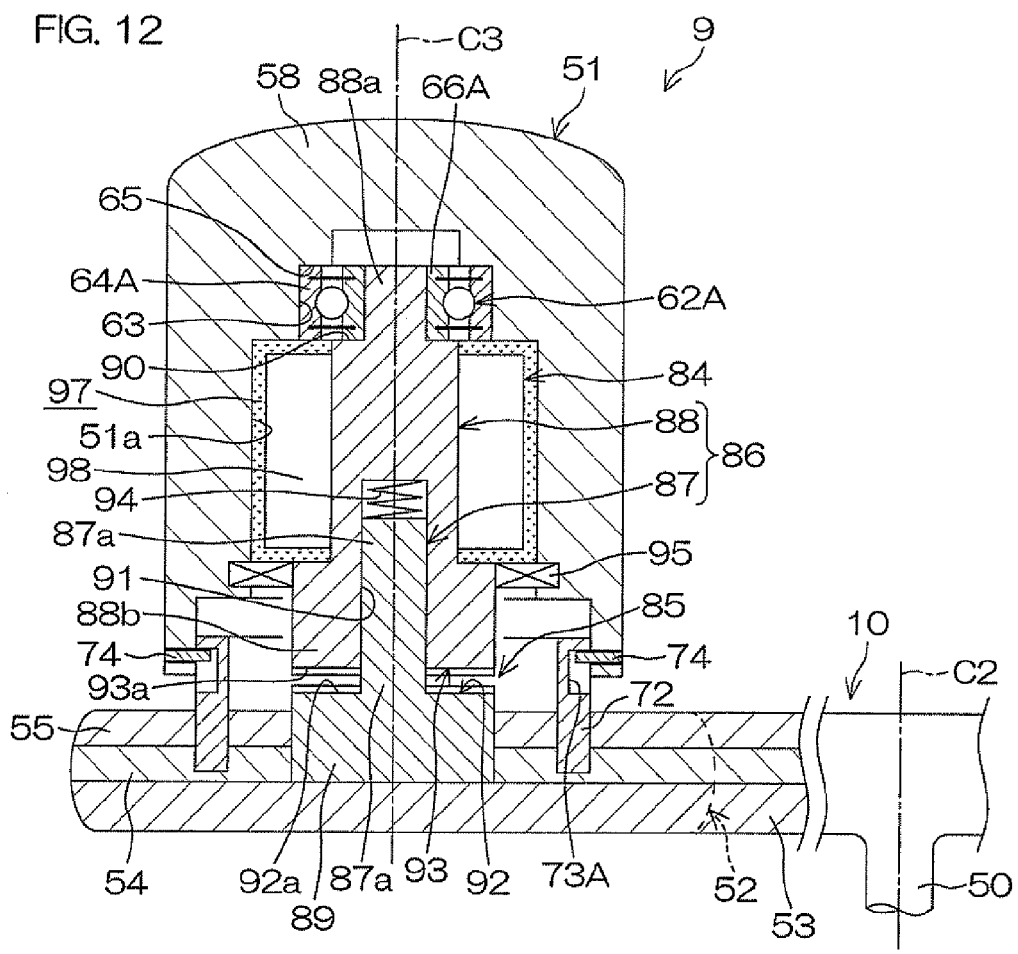
FIG. 12 is a schematic cross-sectional view of a steering member and a knob according to a further embodiment of the present invention.

FIG. 12 is a schematic cross-sectional view of a steering member and a knob according to a further embodiment of the present invention. Referring to FIG. 12, this preferred embodiment is different from the embodiment shown in FIG. 4 mainly in that an electric motor is used as the knob reaction force actuator in the embodiment of FIG. 4, while a rotary damper 84 is used as the knob reaction force actuator in this preferred embodiment. There is also provided, in this preferred embodiment, a clutch 85 capable of providing switching between a state of functioning and a state of not functioning the rotary damper 84.

A knob spindle 86 serving as a knob support is provided on which the knob 51 is rotatably supported via a sealable bearing 62A. The knob spindle 86 includes a fixed shaft 87 constituted by a stepped shaft that is fixed to the core metal 54 and a movable shaft 88 (i.e. a damper shaft) coupled concentrically to the fixed shaft 87 in an axially movable and relatively rotatable manner. That is, the knob spindle 86 is dividable into the fixed shaft 87 and the movable shaft 88.

The fixed shaft 87 is constituted by a stepped shaft one end 87a of which has a base 89 fixed to the core metal 54. One smaller-diameter end 88a of the movable shaft 88 rotatably supports the knob 51 via the bearing 62A. The bearing 62A is held in the bearing holder 63 provided in the end wall 58 of the knob 51. An outer wheel 64A of the bearing 62A is in contact with the positioning stepped portion 65 at one end of the bearing holder 63, so that the axial movement with respect to the knob 51 is restricted. On the other hand, an inner wheel 66A of the bearing 62A is in contact with a positioning stepped portion 90 at the one end 88a of the movable shaft 88, so that the axial movement with respect to the movable shaft 88 is restricted. With this arrangement, the knob 51 is coupled to the movable shaft 88 via the bearing 62A in a manner axially movable together with the movable shaft 88.

The fixed shaft 87 is fitted into a fitting hole 91 provided in the movable shaft 88. The other end 88b of the movable shaft 88 is opposed to the base 89.

The clutch 85 is provided between the fixed shaft 87 and the movable shaft 88 to couple and decouple the shafts 87 and 88 in a relatively non-rotatable manner. Specifically, the clutch 85 includes a first clutch face 92 formed on the base 89 of the fixed shaft 87, a second clutch face 93 formed on the end face at the other end 88b of the movable shaft 88 and engageable with the first clutch face 92, and a return spring 94 provided between the one end 87a of the fixed shaft 87 and the bottom of the fitting hole 91 in the movable shaft 88 to urge the shafts 87 and 88 in a direction in which the first and second clutch faces 92 and 93 move away from each other.

Figure 13:
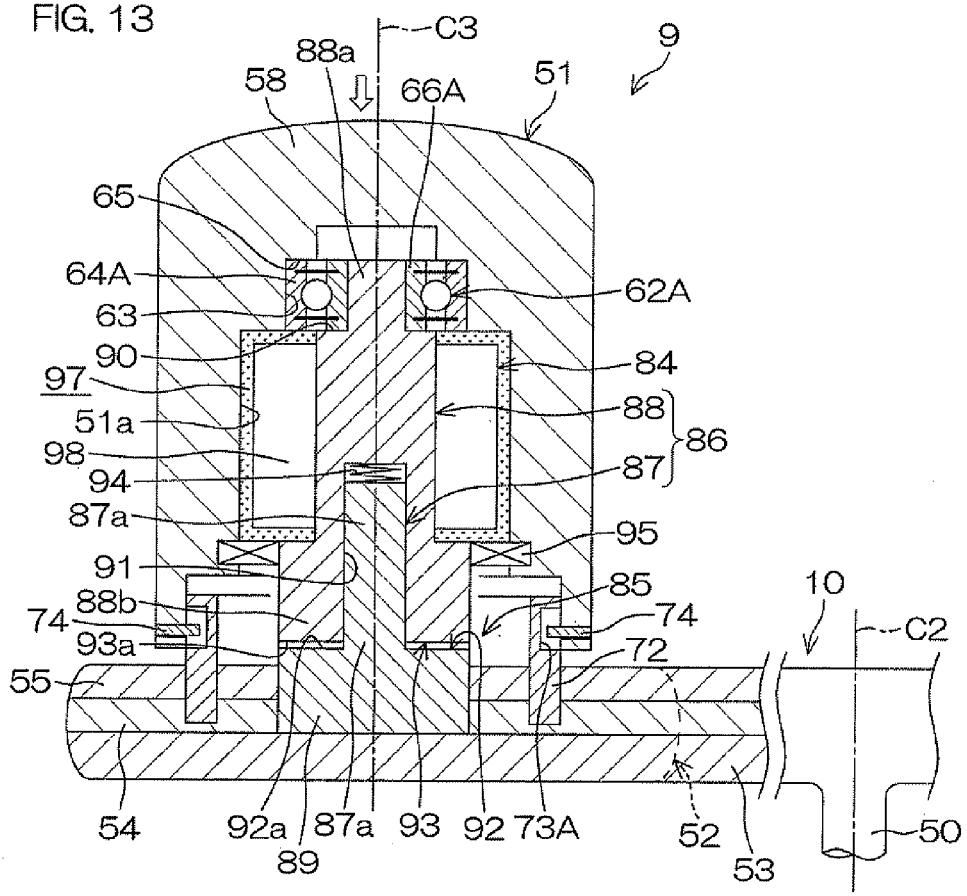
FIG. 13 is a schematic cross-sectional view of the steering member and the knob during knob-based manipulation according to the embodiment shown in FIG. 12.

On the first and second clutch faces 92 and 93 are, respectively, formed radially extending teeth 92a and 93a, and the teeth 92a and 93a on the clutch faces 92 and 93 are mutually engageable. As shown in FIG. 13, when the teeth 92a and 93a are engaged with each other, the rotation of the movable shaft 88 with respect to the fixed shaft 87 is restricted.

An oil seal 95 is provided between the inner periphery 51a of the knob 51 (inner periphery of the cylindrical portion 57) and the outer periphery of the movable shaft 88 to provide sealing therebetween. The oil seal 95 is housed in a housing groove 96 formed in the inner periphery 51a of the knob 51. A fluid chamber 97 sealed by the sealable bearing 62A and the oil seal 95 is defined between the outer periphery of the movable shaft 88 and the inner periphery 51a of the knob 51. The fluid chamber 97 is filled with viscous fluid.

The rotary damper 84 is constituted by the knob 51 and the movable shaft 88 both defining the fluid chamber 97 and a damper element 98 integrally rotatable with the movable shaft 88 within the fluid chamber 97. The damper element 98 is constituted by, for example, an annular body coupled to the outer periphery of the movable shaft 88.

A guide groove 73A formed in the outer periphery of the guide cylinder 72 has a predetermined width in the direction parallel to the knob center C3 so that when the knob 51 moves in the direction, the pin 74 is allowed to move integrally with the knob 51.

Components in this preferred embodiment identical to those in the embodiment shown in FIG. 4 are designated by the same reference numerals as in the embodiment of FIG. 4.

According to this preferred embodiment, when the driver holds the knob 51, the knob 51 moves in response to the return spring 94 toward the steering wheel 52 as shown in FIG. 13, so that the first and second clutch faces 92 and 93 of the clutch 85 are engaged with each other. This causes the movable shaft 88 to be coupled to the fixed shaft 87 non-rotatably. Therefore, when the driver rotates the steering wheel 52 of the steering member 10 while holding and rotating the knob 51, the knob 51 and the damper element 98 of the rotary damper 84 rotate relatively while shearing the viscous fluid therebetween. This causes the rotary damper 84 to give a reaction force in response to the rotation of the knob 51. The rotary damper 84 can give a knob reaction force proportional to the rotation speed (rotation angular speed) of the knob 51. This can improve the driving safety of the forklift 1. In addition, the reaction force can be given with no control, resulting in a simple structure and a reliable operation.

The present invention is not restricted to the above-described embodiments. Instead of the electrostatic sensor shown in FIG. 4, the holding sensor 75 may be constituted by, for example, a strain sensor for detecting the bending of the knob spindle 56, a pressure sensor for detecting the pressure on the surface of the knob 51, or a push-button switch. Alternatively, two or more holding sensors of these different types may be combined.

Although the motor vehicle in the above-described embodiments is, for example, a loading vehicle and, in particular, a forklift, the present invention is not restricted thereto. The present invention is applicable to any kind of motor vehicle (e.g. motor vehicles for people with disabilities) as long as it has a handle (steering member) with a knob.

The present invention has heretofore been described in detail with reference to some specific aspects. Those skilled in the art who understand the foregoing disclosure will easily come up with modifications, variations and equivalents of the invention. Therefore, it should be understood that the scope of the invention be defined by the following claims and the equivalents thereof.

This application corresponds to Japanese Patent Application No. 2010-137448 filed with the Japan Patent Office on Jun. 16, 2010, which is herein incorporated by reference in its entirety.

REFERENCE NUMERALS

1: Forklift (Loading vehicle), 2: Vehicle body, 3: Loading apparatus, 6: Rear wheel (Steered wheel), 9: Motor vehicle steering system, 10: Steering member, 11: Steering actuator, 12: Knob reaction force actuator, 13: Wheel reaction force actuator, 14: Steering angle sensor, 50: Steering shaft, 51: Knob, 52: Steering wheel, 53: Spoke, 54: Core metal, 56: Knob spindle, 59: Stator, 60: Rotor, 62: Bearing, 62A: Sealable bearing, 69: Movable portion, 70: Fixed portion, 71: Knob position sensor (Knob position detection means), 72: Guide cylinder, 73: Guide groove, 74: Pin, 75: Holding sensor (Holding detection means), 84: Rotary damper, 85: Clutch, 86: Knob spindle, 87: Fixed shaft, 88: Movable shaft, 89: Base, 91: Fitting hole, 92: First clutch face, 93: Second clutch face, 94: Return spring, 95: Oil seal, 97: Fluid chamber, 98: Damper element, 100: ECU (Control means), 101: Knob rotation angular speed calculating section, 102: Knob rotation angular speed detecting section, A1: Steering mechanism, C2: Wheel center, C3: Knob center, $\theta_H$: Steering angle, $\theta_H'$: Steering angular speed (Steering speed), $\theta_N$: Knob rotation angle (Knob position), $\theta_N'$: Knob rotation angular speed (Knob rotation speed), $T_H$: Wheel reaction force, $T_H^*$: Target wheel reaction force, $T_N$: Knob reaction force, $T_N^*$: Target knob reaction force

The invention claimed is:
1. A motor vehicle steering system comprising:
a steering member including a steering wheel and a knob rotatably supported on the steering wheel, the knob being configured to rotationally manipulate the steering wheel for steering a steered wheel of a motor vehicle; and
a knob reaction force actuator configured to provide a reaction force to the knob in response to rotation of the knob relative to the steering wheel, wherein
the knob has a knob center and is supported by the steering wheel in a manner rotatable about the knob center.

2. The motor vehicle steering system according to claim 1, wherein
the knob reaction force actuator includes an electric motor,
the system further comprising control means for performing reaction force control of controlling the reaction force by the knob reaction force actuator.

3. The motor vehicle steering system according to claim 2, further comprising knob position detection means for detecting a position of the knob about the knob center, wherein
the control means is arranged to control the reaction force by the knob reaction force actuator based on the position of the knob about the knob center detected by the knob position detection means.

4. The motor vehicle steering system according to claim 2, further comprising knob rotation speed detection means for detecting rotation speed of the knob about the knob center, wherein
the control means is arranged to control the reaction force by the knob reaction force actuator based on the rotation speed of the knob detected by the knob rotation speed detection means.

5. The motor vehicle steering system according to claim 2, further comprising holding detection means for detecting the knob being held, wherein
the control means is arranged to perform reaction force control for the knob reaction force actuator under a condition that the holding detection means detects the knob being held.

6. The motor vehicle steering system according to claim 5, further comprising:
a wheel reaction force actuator for giving a reaction force to the steering wheel in response to rotation of the steering wheel, wherein
the control means is arranged to perform reaction force control for the wheel reaction force actuator regardless of whether or not the control means performs reaction force control for the knob reaction force actuator.

7. The motor vehicle steering system according to claim 1, further comprising:
a knob support fixed to the steering wheel to support the knob, wherein
the knob reaction force actuator is a rotary damper provided between the knob support and the knob, the knob reaction force actuator being configured to provide a reaction force caused by viscous resistance in response to rotation of the knob about the knob center.

8. The motor vehicle steering system according to claim 7, wherein
the knob is supported by the knob support in a manner movable in a predetermined direction along the knob center, and the rotary damper includes a damper element rotatably coupled to the knob support and arranged to generate the viscous resistance while rotating with respect to the knob,
the system further comprising a clutch configured to switch between a state of restricting and a state of not restricting the rotation of the damper element as the knob moves in the predetermined direction.

9. The motor vehicle steering system according to claim 1, wherein
the steering member and the steered wheel are mechanically decoupled.

10. The motor vehicle steering system according to claim 1, wherein the knob center is parallel with a central axis of the steering member.

11. The motor vehicle steering system according to claim 1, wherein
the knob reaction force actuator includes an electric motor,
the system further comprising a controller configured to perform reaction force control of controlling the reaction force by the knob reaction force actuator.

12. The motor vehicle steering system according to claim 11, further comprising a knob position sensor configured to detect a position of the knob about the knob center, wherein
the controller is arranged to control the reaction force by the knob reaction force actuator based on the position of the knob about the knob center detected by the knob position sensor.

13. The motor vehicle steering system according to claim 11, further comprising a knob rotation speed detector configured to detect rotational speed of the knob about the knob center, wherein
the controller is configured to control the reaction force by the knob reaction force actuator based on the rotation speed of the knob detected by the knob rotation speed detector.

14. The motor vehicle steering system according to claim 11, further comprising a holding sensor for detecting the knob being held, wherein
the controller is configured to perform reaction force control for the knob reaction force actuator under a condition that the holding sensor detects the knob being held.

15. The motor vehicle steering system according to claim further comprising:
a wheel reaction force actuator for giving a reaction force to the steering wheel in response to rotation of the steering wheel, wherein
the controller is configured to perform reaction force control for the wheel reaction force actuator regardless of whether or not the controller performs reaction force control for the knob reaction force actuator.

* * * * *

UNITED STATES PATENT AND TRADEMARK OFFICE
CERTIFICATE OF CORRECTION

| | |
|---|---|
| PATENT NO. | : 9,108,667 B2 |
| APPLICATION NO. | : 13/695728 |
| DATED | : August 18, 2015 |
| INVENTOR(S) | : Ryouhei Hayama et al. |

Page 1 of 1

It is certified that error appears in the above-identified patent and that said Letters Patent is hereby corrected as shown below:

In the Claims

Column 16, line 40 of claim 15 delete the text beginning with "system according to claim" and replace with --system according to claim 14--.

Signed and Sealed this
Tenth Day of November, 2015

Michelle K. Lee
*Director of the United States Patent and Trademark Office*